Patented Sept. 9, 1952

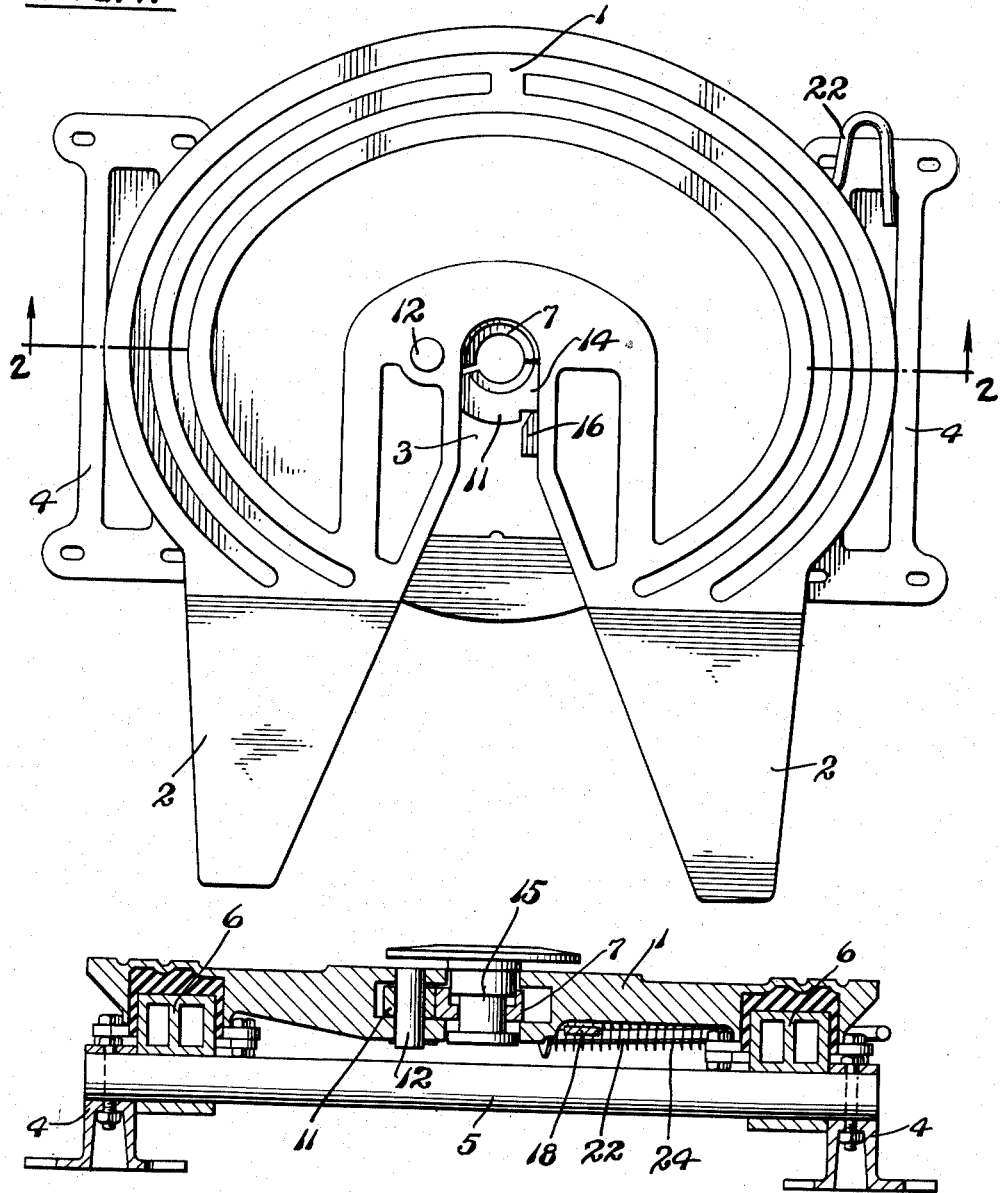

2,610,069

UNITED STATES PATENT OFFICE 2,610,069

FIFTH WHEEL SIDE RELEASE LOCKING MECHANISM

Henry Ketel, Holland, Mich., assignor to Holland Hitch Company, Holland, Mich., a corporation of Michigan Application December 27, 1949, Serial No. 135,251

3 Claims. (Cl. 280—33.05)

The present invention relates to a novel and very useful release locking mechanism in connectio with fifth wheels, used at the back and the upper side of a tractor or truck to detachably connect with a strong and heavy pin fastened at the front portion and at the under side of a frame of a trailer to be drawn by the tractor or truck.

Such structures require exceptional strength and durability, and it is desirable that they be automatically locked when the tractor or truck is backed into position and the fifth wheel engaged with such pin. On reaching a destination where the tractor or truck is to be separated from the trailer, a release of the locking connection with the fifth wheel and pin is, preferably, at a side of the tractor where an operator may conveniently reach it and by manual operation disconnect the fifth wheel on the tractor or truck and the pin on the trailer, and retain the parts in released position against a return to their locking position which, if it occurred would obstruct the entrance of the pin on the trailer to its operative position in the fifth wheel upon reconnection of the pulling truck with the trailer. At the same time, after such entrance of the pin into its proper position in the fifth wheel, an automatic release of the lock so that it takes its locking position without manual release of the lock is obtained. It is a primary object and purpose of the present invention to provide a lock for fifth wheels readily released when wanted and which will maintain its unlocked position but will automatically take its operative locking position when a truck and a trailer to be drawn thereby are connected together. The invention further contemplates a particularly sturdy, relatively simple and economical structure, having all of the advantages and properties above enumerated and which is of a novel structure, readily manufactured and assembled.

An understanding of the invention may be had from the following description, taken in connection with the accompanying drawings, in which, Fig. 1 is a plan view of a fifth wheel equipped with my invention.

Fig. 2 is a transverse vertical section therethrough, substantially on the plane of line 2—2 of Fig. 1, looking in the direction indicated.

Like reference characters refer to like parts in the different figures of the drawings.

Figure 3:
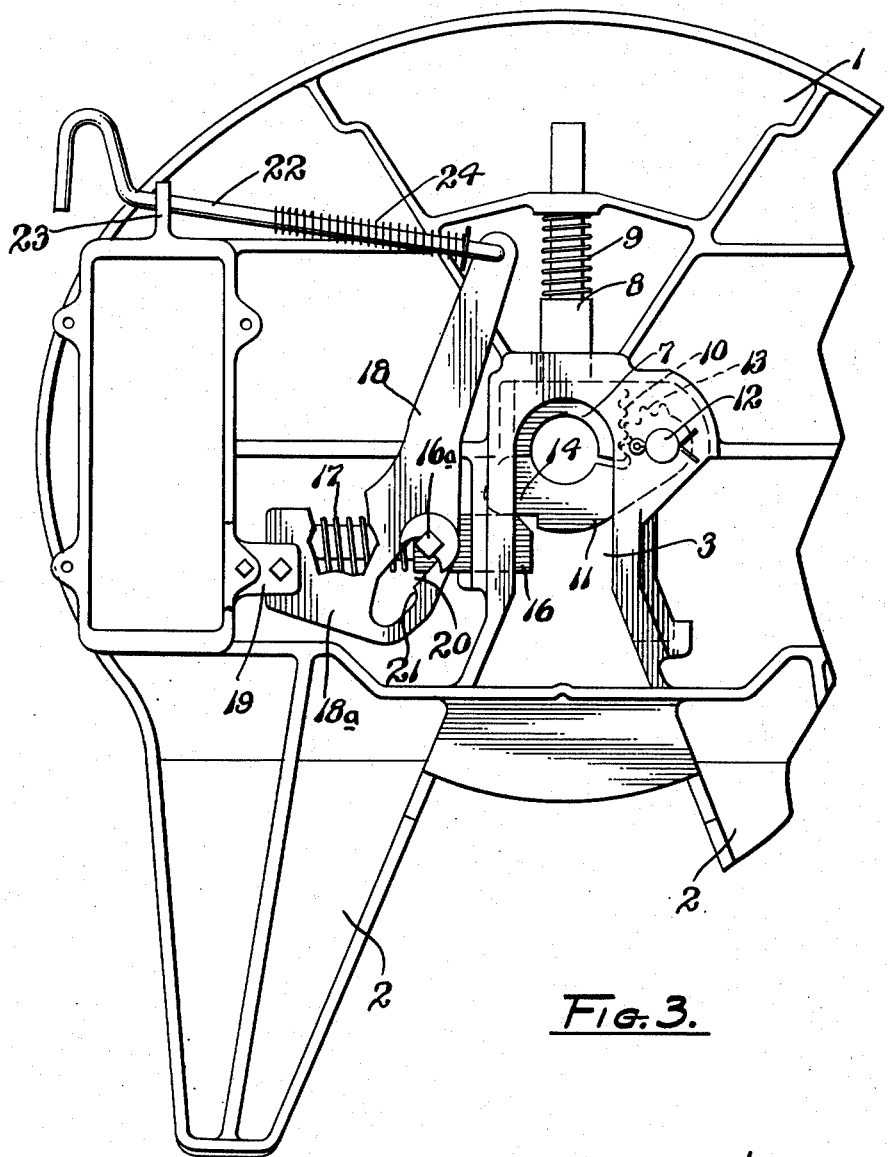
Fig. 3 is an under plan view, with some parts broken away and removed, of the structure shown in Fig. 1.

In the usual fifth wheel construction, a body 1 of generally the shape shown, at its rear side has two spaced apart legs 2 of which the inner edges converge toward each other forwardly, and join a slot 3 substantially at the center of the body, which slot at its inner end is closed and is of a generally semi-circular outline as shown. The body is mounted upon two spaced apart supporting brackets 4, which in turn are rigidly connected at the back and upper side of the chassis of a truck or the like, between which is a horizontal shaft 5 mounted in bearings in the brackets 4 at its ends, with connectors 6 through which the shaft 5 passes bolted or otherwise securely attached at the under side and at opposite edge portions of the body 1, usually with rubber fillers between such connectors 6 and the body 1. This permits the body 1 to be turned to different angular positions about the horizontal axis of the shaft 5.

At the inner or closed end of the slot 3 a head 7, which at its outer end has a semi-circular recess therein, is slidably mounted having extending from it a bar 8 which at its free end is reduced in size and is of a circular cross section, slidably passing through a fixed guide portion of the body 1, and acted upon by a compression spring 9 to normally move in a rearward direction, under the influence of such spring when free to do so. A side of the head 7 is provided with rack teeth 10. Cooperating with the rear recessed end of the head 7 is a holding lever 11 mounted adjacent one end on a generally vertical pin 12 which is carried by the body 1 and having segmental pinion teeth 13 in mesh with the rack teeth 10. When the spring 9 is free to do so and moves the head 7 to the rear, it automatically swings or throws the holding member 11 across the slot 3 and brings it into a pin retaining relation with the recessed rear end of the head 7, such lever 11 in direct conjunction with such recess having a cooperating recess so that the opening provided is of circular form. The free end of the holding lever 11, indicated at 14, is reduced somewhat in thickness as shown. The pin 15 shown in Fig. 2, which is adapted to be secured at the under side and front portion of a frame of a trailer, has a reduced intermediate portion which generally fits the circular opening made by the parts 7 and 11, being enlarged in diameter both above and below such reduced portion so that movement in the direction of the length of the pin 15 is restricted.

A locking dog 16 is slidably mounted on the body 1 at one side of the slot 3, and is normally forced outward by a coiled spring 17 so that the dog, when free to be moved by the spring 17, is moved back of the free end portion 14 of the holding lever 11, which is securely held against movement until the locking dog 16 is retracted. The structure thus far described is the environment with which my invention is preferably used.

On the form of structure shown in Figs. 1 to 3 inclusive, a bell crank lever 18, has an arm 18a thereof pivotally connected to a lug 19, fixed with respect to the body 1. Adjacent the juncture of the two arms of the bell crank lever, a slot 20 is cut therein which is widened at its rear portion providing a shoulder 21. A roller is carried on a stud 16a on the locking dog 16 which, when the bell crank lever is swung counterclockwise (Fig. 3), traverses the slot. The dog 16 is withdrawn against the spring 17 and the roller, when it reaches the shoulder at 20, is pressed into such shoulder and is held therein by the pressure of the spring 17, retaining the locking dog 16 in retracted position.

A rod 22, pivotally connected to the free end of the lever 18, extends outwardly to a side of the body 1, being guided through a lug 23 fixed with respect to the body. It has a handle at its outer end for grasping to move the rod 22 longitudinally and swing the lever 18 to withdraw the dog 16. A relatively light compression spring 24 is on the rod 22 which, when the rod 22 is drawn outwardly reaches the lug 23 and is somewhat compressed when the lever 18 has reached the position in which the dog 16 is locked against return movement.

Figure 4:
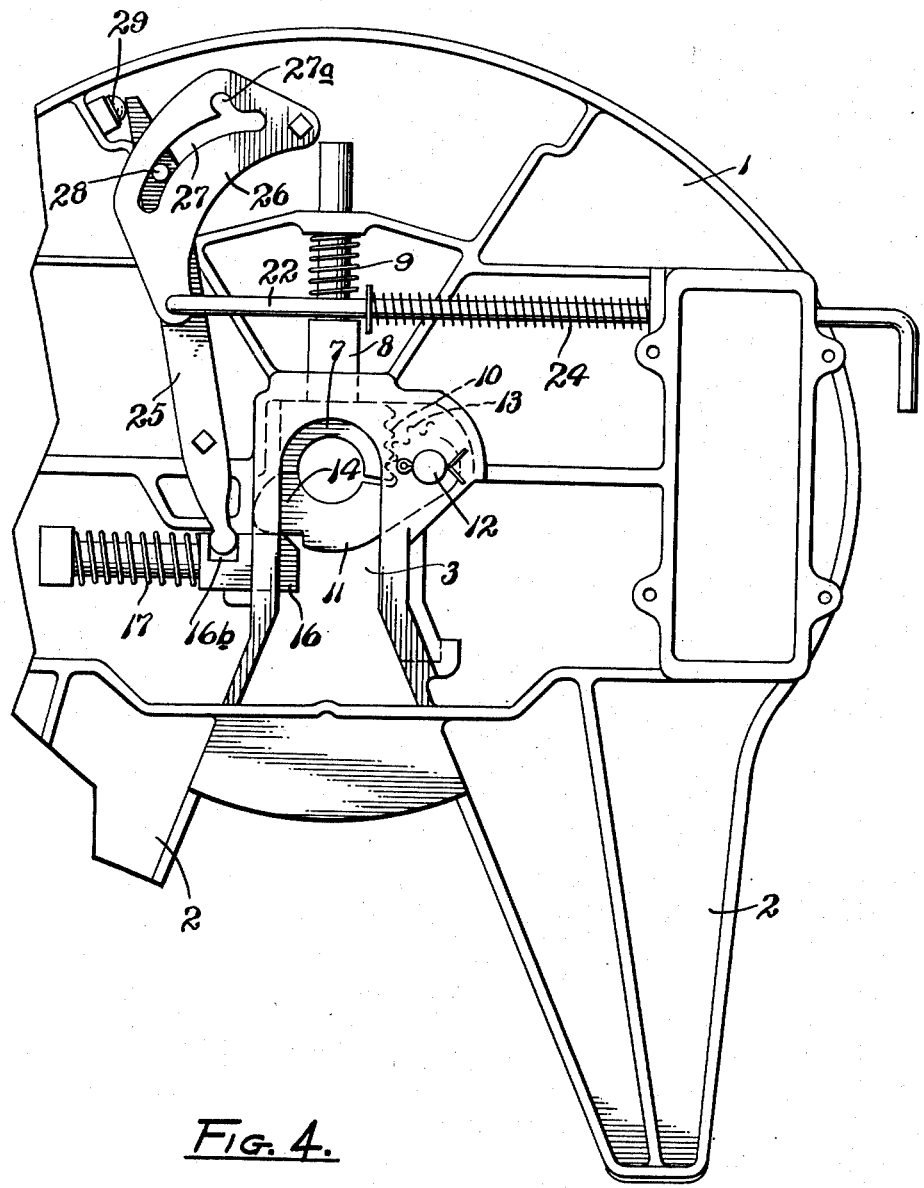
Fig. 4 is an under plan view of a different form of the releasing lock which attains the same results by the same operative principles.

In Fig. 4, in the modified form of mechanism to operate the locking dog, a lever 25 is pivotally mounted between its ends. It generally parallels the rod 8 and at one end has a head received in a notch or socket 16b in the adjacent side of the dog 16. A plate 26 is pivotally mounted at one end of the body 1 and at its other end has the rod 22 pivotally connected thereto, which extends outwardly to a side of the body, having a handle at its outer end for manual movement. In the plate 26 a somewhat arcuate slot 27 is made as shown, into which a pin 28 adjacent the free end of the lever 25 extends. Closer to the free end of the lever 25 an abutment 29 is provided on the body 1 for such free end of the lever to strike against when it is free to be turned counterclockwise (Fig. 4) by the spring 17.

On an outward pulling movement of the rod 22, lever 25 is turned to retract the dog 16 against the spring 17, and the pin 28 moves lengthwise of the slot 27 until it reaches the branch recess 27a therein, shown in Fig. 4. When a tractor is backed into engagement with pin 15 carried at the under side of the front end portion of a trailer frame, such pin will enter the slot 3 and a continuing rearward movement of the tractor will cause a compression of the spring 17, a forward movement of the head 7. The retaining lever 11 which has been swung to open position substantially at right angles to the position shown in Figs. 3 and 4, will be automatically turned to closing position. The locking dog 16 in either form of structure will have been withdrawn and retained out of the path of movement of the pin 15 and out of the slot 3. The rounded end of the projecting end portion 14 of the lever 11, camming against the free end of the dog 16, forces the dog still further against the spring 17, so as to release from the shoulder at 21, or the pin 28 from the recess at 27, and farther into the slots 20 or 27 until such lever 11 passes beyond the dog, whereupon spring 17 acts to project the dog into position back of the end 14 of the retaining lever 11, thus locking the pin 15 against disengagement. When a destination is reached wherein the trailer and tractor are to be separated, it is necessary only to manually pull the rod 22 outward until the dog reaches a position where it is held against return to its operative locking position.

It will be understood from the foregoing that the connection of a trailer with a tractor having the fifth wheel of my invention thereon, is automatically attained on backing the tractor into proper position. Whenever the tractor and trailer are to be separated, it is almost immediately performed by an outward pull on the rod 22, the parts being left in a condition where automatic reengagement may be performed. The invention is practical, of great utility, sturdy and economically manufactured. The claims appended hereto define the invention which is to be considered comprehensive of all forms of structure coming within their scope.

I claim:

1. In a structure as described, a body member having a pin entrance opening at one side terminating near the central portion of said body member in a slot with a closed end and having parallel sides, a head movably mounted on the body member near the closed end of said slot, a rod extending from said head slidably mounted on the body member, a spring acting on said rod to normally move the head toward and into said slot, said head at its outer side having a pin receiving recess therein, a lever cooperating with said head pivotally mounted at one end on the body member and adapted to be swung across the slot, and having a cooperating recessed inner side to engage a pin, gearing connection between said head and lever for swinging the lever in opposite directions in accordance with the direction of movement of said head, the lever being swung across the slot when the head is moved against said spring, a spring actuated locking dog slidably mounted on said body member, means for retracting said dog including a handle rod having an end adapted for manual engagement located at one side of the body member, means included in said last mentioned means for retaining the dog in retracted position, said dog when in retracted position having an end engageable by the free end of said pin engaging lever to further retract it and automatically free said dog from its retaining means, whereby when the pin engaging lever passes by the end of said dog and into pin engaging position across the slot, the dog is moved into the path of movement of the free end portion of said pin engaging lever to hold it against release until the dog is manually retracted.

2. In a fifth wheel, having a body member provided with a pin entrance at one side terminating in a slot closed at its inner end, a spring actuated pin engaging member mounted on the body member at the inner end of the slot normally spring moved into said slot, a cooperating pin engaging lever pivotally mounted on the body member at one end, means operatively connecting said pin engaging members to swing said cooperating pin engaging lever across the slot upon pressure against the first pin engaging member, said cooperating pin engaging lever being normally swung to open position out of the slot, a slidably mounted locking dog mounted on said body member, and spring means actuating said dog to normally move it at one end into said slot into the path of movement of said pin engaging lever to lock the same in pin locking position across said slot, the improvement comprising, a second lever pivotally mounted on said body member, adjacent one end thereof, a handle member connected at the other end of the second lever extending to a side of the body, said second lever extending across said locking dog and having a slot therein, and said locking dog having a member connected therewith located in said slot, said slot between its end being provided with a retaining shoulder engaging with said dog carried member upon swinging said second lever by manual operation, the locking dog being withdrawn to move the member thereon past said shoulder.

3. In a fifth wheel, having a body member provided with a pin entrance at one side terminating in a slot closed at its inner end, a spring actuated pin engaging member mounted on the body member at the inner end of the slot normally spring moved into said slot, a cooperating pin engaging lever pivotally mounted on the body member at one end, means operatively connecting said pin engaging members to swing said cooperating pin engaging lever across the slot upon pressure against the first pin engaging member, said cooperating pin engaging lever being normally swung to open position out of the slot, a slidably mounted locking dog mounted on said body member, and spring means actuating said dog to normally move it at one end into said slot into the path of movement of said pin engaging lever to lock the same in pin locking position across said slot, the improvement comprising, a second lever pivotally mounted on the body member between its ends having means at one end engaging the locking dog, a pin extending laterally from said lever adjacent its opposite end, a plate pivotally connected adjacent one end on the body member, having an arc-shaped slot with a branch recess, said pin on the lever extending into the slot, said manually operable handle member having a pivotal connection to the opposite end of the plate and extending outwardly to one side of the body member.

HENRY KETEL.

REFERENCES CITED

The following references are of record in the file of this patent:

UNITED STATES PATENTS

| Number | Name | Date |
|---|---|---|
| 1,981,233 | Harris | Nov. 20, 1934 |
| 2,096,282 | Kortering | Oct. 19, 1937 |
| 2,469,279 | Seyferth | May 3, 1949 |